US012237651B2

(12) United States Patent
Wahl et al.

(10) Patent No.: US 12,237,651 B2
(45) Date of Patent: Feb. 25, 2025

(54) DEVICE AND METHOD FOR THE IONIZATION OF GASEOUS MEDIA

(71) Applicant: KIST + ESCHERICH GMBH, Munich (DE)

(72) Inventors: Reiner Wahl, Dresden (DE); Stefan Kist, Dresden (DE); Thomas Eckardt, Dresden (DE); Scott Trimble, Bampton (GB); Alec Smith, Bampton (GB); Philip Anthony, Bampton (GB)

(73) Assignee: Kist + Eschrich GmbH, Munich (DE)

( * ) Notice: Subject to any disclaimer, the term of this patent is extended or adjusted under 35 U.S.C. 154(b) by 0 days.

(21) Appl. No.: 18/576,968

(22) PCT Filed: Jun. 1, 2022

(86) PCT No.: PCT/EP2022/064842

§ 371 (c)(1),
(2) Date: Jan. 5, 2024

(87) PCT Pub. No.: WO2023/280481

PCT Pub. Date: Jan. 12, 2023

(65) Prior Publication Data

US 2024/0266808 A1 Aug. 8, 2024

(30) Foreign Application Priority Data

Jul. 8, 2021 (DE) ..................... 10 2021 117 682.4

(51) Int. Cl.
*H01T 23/00* (2006.01)
*H01T 19/04* (2006.01)

(52) U.S. Cl.
CPC ............. *H01T 23/00* (2013.01); *H01T 19/04* (2013.01)

(58) Field of Classification Search
CPC .. H02H 9/046; H01L 27/0255; H01L 27/0266
(Continued)

(56) References Cited

U.S. PATENT DOCUMENTS 5,930,105 A * 7/1999 Pitel ........................ H01T 23/00 361/213
6,744,617 B2 6/2004 Fuji
(Continued)

FOREIGN PATENT DOCUMENTS

DE 19749070 C1 6/1999
DE 10320805 A1 12/2004
(Continued)

OTHER PUBLICATIONS

Funiwara, Nobuhiro; Title: A static eliminator; DE112006001667; Publication date: Nov. 29, 2018; Figures and specification (Year: 2018).*

(Continued)

*Primary Examiner* — Dharti H Patel
(74) *Attorney, Agent, or Firm* — Heslin Rothenberg Farley & Mesiti P.C.

(57) ABSTRACT

A device for the ionization of gaseous media, comprising a feed channel (101) having a gas feed, a distribution channel (104) having at least one gas outlet, and at least one ionization unit (304), wherein the at least one ionization unit (304) is designed as a connecting channel from the feed channel (101) to the distribution channel (104) and is provided with an electrode (102) and an associated counter electrode (106). The electrode (102) is configured to ionize gas flowing through the ionization unit (304) from the feed channel (101) to the distribution channel (104), wherein the gas flows around the electrode (102), and the at least one gas outlet is designed in the form of one or more nozzles (107) or a plurality of openings (107).

14 Claims, 4 Drawing Sheets

Figure 1:
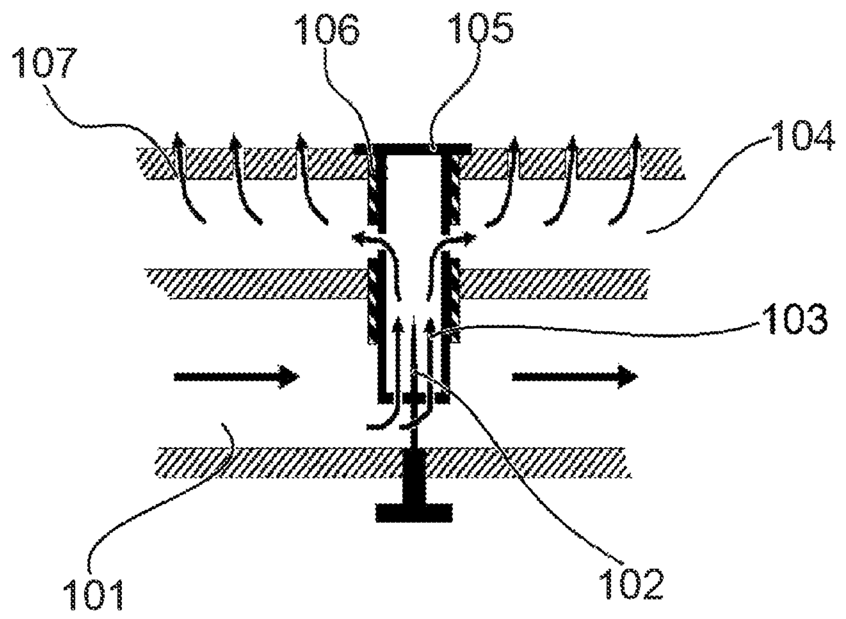

(58) Field of Classification Search
USPC .......................................................... 361/230
See application file for complete search history.

(56) References Cited

U.S. PATENT DOCUMENTS

| | | | | |
|---|---|---|---|---|
| 2009/0135538 | A1 | 5/2009 | Yasuoka et al. | |
| 2009/0219663 | A1* | 9/2009 | Sato | H01T 23/00 361/220 |
| 2010/0128408 | A1* | 5/2010 | Takayanagi | H01T 23/00 361/213 |

FOREIGN PATENT DOCUMENTS

| | | | |
|---|---|---|---|
| DE | 102005056595 | A1 | 6/2006 |
| DE | 102012004270 | A1 | 9/2013 |
| DE | 102014117746 | A1 | 6/2015 |
| DE | 112006001667 | B4 | 11/2018 |
| EP | 1241755 | A2 | 9/2002 |
| EP | 3474396 | A1 | 4/2019 |
| JP | 2001085190 | A | 3/2001 |
| KR | 1020080035228 | A | 4/2008 |
| WO | 2006016738 | A1 | 2/2006 |

OTHER PUBLICATIONS

International Search Report and Written Opinion of International Application No. PCT/EP2022/064842, Sep. 30, 2022, 17 pages. With translation.

* cited by examiner

DEVICE AND METHOD FOR THE IONIZATION OF GASEOUS MEDIA

CROSS REFERENCE TO RELATED APPLICATIONS

This application is a national stage filing under section 371 of International Application No. PCT/EP2022/064842, filed on Jun. 1, 2022, and published on Jan. 12, 2023, as WO 2023/280481, which claims priority to German Application No. 10 2021 117 682.4, filed on Jul. 8, 2021. The entire contents of WO 2023/280481 and German Application No. 10 2021 117 682.4 are hereby incorporated by reference herein.

The invention relates to a device and to a method, and to the use thereof, for the ionization of gaseous media.

In industrial processes for producing a wide variety of products, the electrostatic charge of surfaces and therefore often the undesired adhesion of dust particles to the given workpieces constitutes a general problem. In order to remove these charges, or even avoid them in the first place, both systems without and with air support are known. For the latter, inter alia the following concepts of very different ionisers are mentioned in the prior art.

DE 10 2005 056 595 A1 discloses an ionizer with a hollow housing which, among other things, accommodates a high-voltage unit and a control unit. A plurality of electrode units in the form of needle electrodes and an air outlet for blowing an air flow around the needle electrodes, are also arranged in a row along the longitudinal direction of the housing. A part of the hollow housing consists of plastic in the longitudinal direction and is formed in a channel of an air passage such that a portion of the inner wall of the plastic housing serves as a wall of this channel. The air passage is in connection with the air outlet.

KR 10 0 2008 035 228A describes a rod-shaped ionizer. This ionizer has a rod, discharging electrodes, grounding electrodes, high voltage generation units and controls, and nozzles. The nozzles are arranged parallel to the rod in order to eject air at a predetermined pressure at a defined ejection angle in the direction of an object to be discharged. The nozzles can be electrically charged by the discharging electrode. The nozzles and electrodes are thus used such that each nozzle has its own control and blows out the air ionized by the electrode in the nozzle in order to enable stabilization of the ion equilibrium.

WO 2006 0167 38 A1 describes an arrangement for eliminating static electricity. For this purpose, pulsed AC high voltage is used which has a rectangular pulse-type voltage curve. The disclosed electrostatic eliminator comprises a discharge electrode that generates a corona discharge, a grounding electrode, a high-voltage unit that generates an AC pulse high voltage, and a controller which controls the frequency and duty factor of the AC pulse high voltage. Each electrode is integrated into one nozzle which blows the ions out of the nozzle by compressed air. The frequency range of the applied high voltage is limited from 1 Hz to up to 10 KHz. The set duty factor is set to a range of 40% to 60%. The described electrostatic eliminator can adapt the magnitude of the discharge effect via the free control of a frequency and duty factor of the applied voltage.

DE 103 20 805 A1 discloses a device for processing cylindrical substrates having at least one electrically conductive core such as wires, cables or the like, having a process space which has an inlet opening and an outlet opening for the substrate, which is moved in particular continuously relative to the device, wherein by applying a voltage to at least one electrode which is associated with the process space and is fixedly arranged on the device, and a counter electrode in the process space, a plasma can be ignited, and wherein the applied voltage is an AC voltage, characterized in that the at least one electrically conductive wire itself forms the counter electrode, in that a dielectric barrier is formed between the electrode and the at least one electrically conductive wire, which barrier is formed by the substrate itself, and in that the ignitable plasma is an atmospheric pressure low-temperature plasma.

DE 10 2014 117 746 A1 describes a compressed air preparation chamber for improving the flow properties of compressed air or compressed gas mixtures in a painting process, comprising a housing for forming a cavity, at least one air inlet opening and at least one air outlet opening, wherein the air inlet opening and the air outlet opening are arranged in such a way that the compressed air or the compressed gas mixture can flow through the cavity, preferably can flow through in a longitudinal direction, at least one electrode arranged within the cavity, at least one high voltage source for supplying the electrode with high voltage, wherein at least one insulation layer within the cavity is arranged on an inner surface of an outer shell of the housing, and in the interior of the cavity between the electrode and a counter electrode an electromagnetic field, preferably an inhomogeneous electromagnetic field or a partially inhomogeneous electromagnetic field can be generated with an active zone for the flow of compressed air to be prepared.

Furthermore, DE 10 2012 004 270 A1 discloses a device for treating a gas flow, in particular an exhaust gas flow of an internal combustion engine, having at least one radial space through which the gas flow can flow radially and which extends substantially radially from a central region to an outer collecting space, wherein the radial space is delimited by a first and a second approximately disk-shaped wall, and wherein a plurality of electrodes directed into the radial space protrude from the first wall. The first and second disk-shaped walls preferably run substantially parallel. The first disk-shaped wall is preferably made of an electrically insulating material with electrically conductive electrodes fastened therein, which are electrically connected to one another by electrical conductors running in or on the electrically insulating material. Two or more parallel radial chambers can be arranged around the central region, axially following one another.

U.S. Pat. No. 6,744,617 B2 discloses a discharge electrode bar in a housing. An air unit and discharge electrode assemblies are arranged in this housing in its lower region, as are a high-voltage unit and a control unit in its upper region. In this case, the housing consists of left- and right-split housing parts which can be divided and are detachably arranged on one another.

US 2009/0135538 A1 describes an ionizer in which high voltage is generated in a secondary portion of the transformer with a piezoelectric transformer that is formed from a ferroelectric element when an AC voltage is applied to a primary portion of this transformer. By suitably arranged ground electrodes at the upper and lower surfaces of the secondary portion of the piezoelectric transformer, a dielectric barrier discharge around the ground electrodes runs over a dielectric foil for insulation. Positive and negative ions are thereby generated in an air flow which is subsequently blown out of an air nozzle toward an object to be neutralized.

JP 2001085190 A describes an ionizer which generates a stable corona discharge. For this purpose, this ionizer amplifies a control signal with the aid of a piezoelectric transformer. The control signal to be amplified corresponds to the natural oscillation frequency of the piezoelectric transformer.

EP 1 241 755 A2 discloses an ion generating device. An electric field for generating ions between an electrode needle and a counter electrode plate is established and maintained therein. A surface discharge path A which runs through an air discharge opening and has the shortest distance between the electrode needle and the counter electrode plate is thereby generated, as is a surface discharge path B which does not run through the air discharge opening. The distances of the surface discharge paths A and B are varied by structural measures.

Previous systems have disadvantageous designs with respect to the generated ion equilibrium and the spatially homogeneous provision of ions with respect to the component to be discharged. Systems having an ion equilibrium which is suitable for reducing electrostatic voltages to the range well below +/−50 V relative to ground potential are much too big. Such systems often have individual electrode units combined with one blowing nozzle each. The resulting different geometries are thus not sufficiently compact. The relatively large distance of these electrode/blow nozzle units also leads to a spatially inhomogeneous output of the ions, which often leads to strip-like discharges on the components. In contrast, smaller systems without air support for blowing out the ions do not reach the required ion equilibrium since the physically caused imbalance between positive and negative corona discharge combined with the unavoidable partial recombination of generated charge carriers leads to an ion equilibrium that is very difficult to control, and, resulting from this, to significantly higher residual charges than the above-mentioned +/−50 V.

The object of the invention is to overcome the aforementioned disadvantages of the prior art and to propose a suitable design.

The object is achieved by the features of the main claim and by the features of the independent claims. Preferred embodiments are the subject matter of the dependent claims in each case.

According to the invention, a device for the ionization of gaseous media has a feed channel with a gas feed, a vertical channel with at least one gas outlet, and at least one ionization unit. The at least one ionization unit is provided with an electrode and is designed as a connecting channel from the feed channel to the distribution channel. The electrode is configured to ionize the gas flowing from the feed channel to the distribution channel through the ionization unit. The device is characterized in that the gas flows around the electrode, and the at least one gas outlet is designed as one or more nozzles or a plurality of openings.

For the purposes of this document, an ionization unit serves to generate ions within a gaseous medium. In particular and without being limited thereto, ionization units generate the ions by means of high electrical field densities. Other forms of ionization units may contain UV light sources, thermionic emission sources, or even radioactive sources. Ionization units which are based on the principle of field ionization and field emission naturally require at least two electrodes to form the required strong electrical fields. At least one electrode often has a filigree geometry—for example in the form of needles—in order to bring about a local bundling of the electrical field lines and the necessary high field strength of the associated strong inhomogeneity of the electric field. Associated counter electrodes are usually planar. For example, without being limited thereto, counter electrodes can be arranged cylindrically about a needle electrode and, if the spacing is small, a direct flow of current in the form of a sparkover or gap spark, which may be caused by the formed charge carriers, can be prevented by using electrically insulating materials.

In the context of the present document, nozzles and openings do not necessarily have a circular cross-section. Rather, nozzles and openings can, for example, be designed and without being limited thereto, as slots, bores or milled recesses of any geometry.

The solution to the object comprises a method for partial ionization of a gaseous medium with the device according to the invention, wherein the method comprises the following steps:

- applying high voltage between the electrode and the counter electrode,
- feeding a gaseous medium into the feed channel at an operating pressure above the ambient pressure,
- introducing the gaseous medium into the ionization unit through the gas inlet, passing the gaseous medium past the electrode, and discharging the gaseous medium from the ionization unit through the gas outlet into the distribution channel, and
- blowing out the gaseous medium from the distribution channel through at least one opening or nozzle.

In the context of this invention, the operating pressure is the pressure which is necessary to enable a flow of the gaseous medium from the feed channel through the ionization unit until it is blown out. This is achieved by a pressure gradient, wherein the feed channel is placed under a higher pressure than the distribution channel, and the pressure conditions within the distribution channel are above the ambient pressure.

For the purposes of this document, an at least partial ionization of a gaseous medium is understood to mean that not all of the present gas particles are in the form of atoms or neutral molecules.

Complete ionization of the gaseous medium is not the issue here since a destructive current flow between the ionization unit and the corresponding counter electrode would thus occur due to the increasing electrical conductivity. Of course, complete ionization under normal atmospheric conditions—around 1013 hPa air pressure, a relative humidity of about 40%, and ambient temperature of about 20° C.—is not possible due to recombination. Something like this is only achieved in plasmas.

In this respect, partial ionization is a situation that does not change.

In embodiments of the invention, the gaseous medium is air, purified air, nitrogen, argon, carbon dioxide, oxygen, or a mixture thereof.

Advantageously, industrially and commercially available gases or prefabricated gas mixtures can therefore be used. This makes it advantageously possible to make a prediction about the degree of ionization to be expected. Furthermore, in embodiments of the invention, an additional bypass is arranged in such a way that the gaseous medium can be guided partially past the ionization unit. The possibility is thus advantageously created to add portions of the gaseous medium without ions to the ion-containing medium after it flows around the electrode, and thus to achieve an elevated blowing effect. This advantageously makes it possible to individually adapt the intended charge-reducing and cleaning effect.

In embodiments of the invention, the openings or nozzles are arranged in a defined manner on the surface of the distribution channel. The definition of the arrangement is preferably specified by the parameterization of at least one one-dimensional curve in three-dimensional space in which the center points of the openings or nozzles are arranged.

Based on a pressure gradient from the inlet into the distribution channel and up to the gas outlet, a preferred direction can be defined. Along a preferred direction defined in this way, the parameterization of the opening or nozzle points has portions different than zero. This advantageously makes it possible to select positions of the openings or nozzles which are calculated in a manner optimized for flow. Such parameters or parameterizations can be implemented more easily in manufacturing plants, and the manufacturing process can run automatically at this point. Thus, economically efficient production is made possible simultaneously with a maximum degree of individualization. Examples of the one-dimensional curve are straight lines or arcs in the simplest case.

In embodiments of the invention, the electrically insulating material of the ionization unit is made of plastic, glass, ceramic or synthetic resin. This advantageously allows the unavoidable erosion process caused by the impacting ions to be influenced. Since ozone unavoidably arises with corona discharges which can change the materials by its oxidative effect, materials which are resistant to this oxidative effect can advantageously be selected. If there is an economic interest, either a material with high wear can thus be used—which is significantly cheaper for the initial purchase, or suitable ceramics can preferably be installed in systems which are designed for maintenance-free continuous operation. In general, a broad selection of possible electrically insulating materials offers an advantage in production, since a wide variety of geometries can thus also be used.

In embodiments of the invention, the feed channel runs in a feed plane; the distribution channel runs in a distribution plane. These two planes are substantially parallel to one another. In this way, feed channels of any shape and analogously shaped distribution channels are taken into account, wherein the feed and distribution channels formed in this way run parallel to one another. By way of example, without being limited thereto, two identical tube pieces are used in the simplest case. The length of the employed tube pieces exceeds their own diameter multiple times, and both tube pieces run as parallel as possible in their arrangement and orientation. In a further example without restriction, the feed channel and distribution channel are designed annular. In this case, the embodiment can be such that the feed plane and the distribution plane are concentric (using a more abstract plane definition). The planes are understood to be the lateral surfaces of concentric cylinders. This is advantageous since the device can thus be adapted to the geometry of the objects to be cleaned or discharged. An advantageous flow around the objects is achieved in this way, and the surface effect of the cleaning medium is optimized. In embodiments of the invention, the high voltage is designed as an alternating high voltage. In this case, peak values of the voltages from 1 kV up to 50 KV are achieved. Preferably, peak values of the voltages of 1.5 kV to 40 kV are set here, particular preferably of 2 kV to 35 kV. This is advantageous because it can reinforce the good compromise between the design and the degree of ionization.

In embodiments of the invention, the required high voltage to form the required electrical fields is realized by high-voltage sources integrated in the device, which are operated by a low voltage fed in from the outside. This has an advantageous effect on the compactness of the device.

It has proven to be advantageous for a very good ion equilibrium and thus a minimization of the residual charge on the object to be discharged if the distribution channel is at least partially surrounded by a grounded, parallel electrical conductor. This electrical conductor is designed, for example, and without being limited thereto, as a metallic film web or metal sheet.

In embodiments of the invention, measures are applied for controlling and/or regulating the high voltage for the ionization unit within the device. These also include, without being limited thereto, monitoring devices for monitoring the high voltage and the degree of ionization of the gaseous medium.

In embodiments of the invention, the operating pressure of the gaseous medium is set between 50 mbar/50 hPa and 20 bar/2 MPa. This is advantageous since the required flow conditions can be achieved with this pressure range. In gaseous media with pressures below 50 mbar/50 hPa, statistical impact processes increasingly take place as transport phenomena. With decreasing pressure, these processes are increasingly less suitable for forming a continuous flow and a resulting ion transport. In the pressure range above 20 bar or 2 MPa, gas particles, in particular the generated ions, have a significantly reduced average clear travel path, which leads to increased recombination. Furthermore, the advantageous pressure range can be achieved with commercially available measures, which entails economic advantages in construction and supply.

Another aspect of the invention relates to the use of the device according to the invention for at least partial ionization of a gaseous medium. A cascaded device made of a feed channel and a plurality of distribution channels with at least one ionization unit is also conceivable. This is advantageous in order to allow an optimal discharge effect even for the most complex objects of larger dimensions, while maintaining the optimized design of a single ionizer according to the invention.

In order to realize the invention, it is also expedient to combine the above-described embodiments and the features of the claims.

The object of the invention is described in more detail in the following by non-restrictive figures and exemplary embodiments.

FIG. 1 shows a schematic sectional view of a linear channel arrangement with a connecting ionization unit. The sectional plane is selected in such a way that one of the plane-spanning axes corresponds with the longitudinal axis of the needle electrode (102) inside the ionization unit, and a second axis corresponds to the longitudinal axis of the channel arrangement. Moreover, the possible flow direction of a gaseous medium—for example air—through the ionization unit is also shown. The air flows along the feed channel (101). Part of the air flow passes into the ionization unit. This part forms a flow (103) around the needle electrode (102). For reasons of clarity, the electrical wiring between the needle electrode (102) and counter electrode (106) has not been drawn. However, the ionization unit has a housing made of an electrically insulating material (105). The flowing air leaves—if the electrical voltages according to the invention are connected—after its partial ionization, the ionization unit through the provided openings into the distribution channel (104). Nozzle openings (107) are introduced into the distribution channel (104) through which the partially ionized air escapes from the device.

Figure 2:
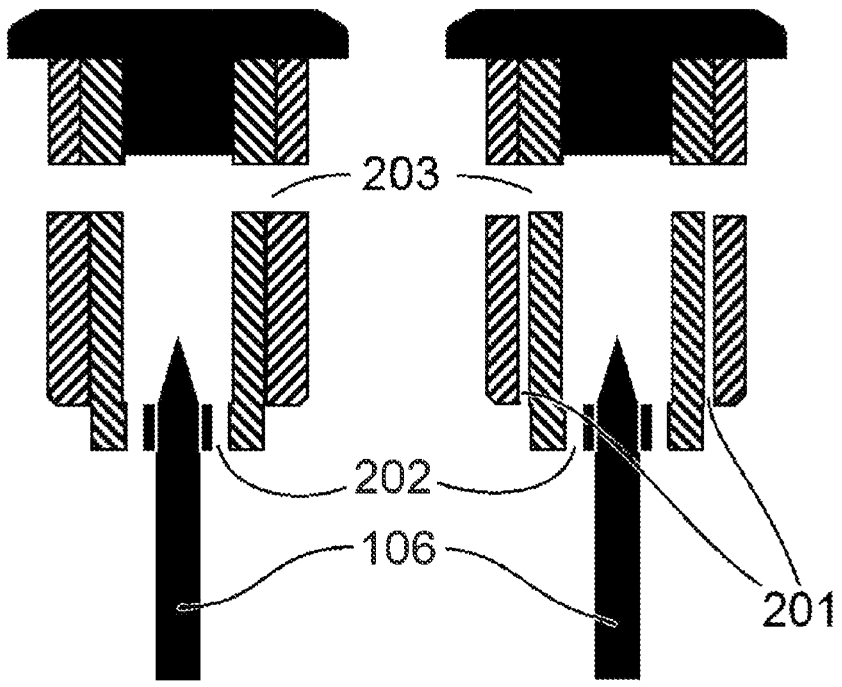

FIG. 2 schematically shows two partial illustrations of ionization units. The partial illustrations each show a sectional view without and with a bypass. The sectional plane is spanned by a cylinder axis which runs along the needle electrode (106), and the radial axis which runs along an imaginary feed channel. The partial illustration on the left shows the ionization unit without a bypass, accordingly, only the air inlet (202) and the associated outlet (203) are entered. The partial illustration on the right shows the ionization unit with the air inlet (202), the associated outlet (203), and the bypass (201).

Figure 3:
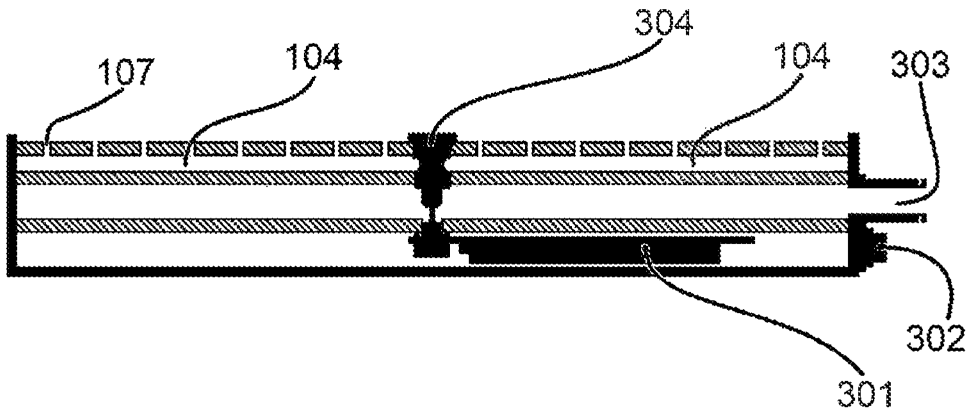

FIG. 3 schematically shows a longitudinal section of a device according to the invention. The sectional plane is spanned by the longitudinal direction of the device and by the longitudinal direction of the ionization unit. A separated region is indicated in the interior of the device below the feed channel. A high-voltage supply (301) is arranged therein, which is electrically conductively connected to the needle electrode of the ionization unit (304) and to the counter electrode. This high-voltage unit is supplied by the low-voltage connection (302). This low-voltage connection is arranged in the figure below the inlet of the feed channel (303). The gaseous medium thus flows through the inlet (303) along the feed channel, and is subsequently guided (according to one of the possibilities analogous to FIG. 2) through the ionization unit (304), and is at least partially ionized. Subsequently, the mass flow of the air carries the ions from the ionization unit into the distribution channel (104). From there, the air/ion mixture flows out of the nozzle openings (107).

Figure 4:
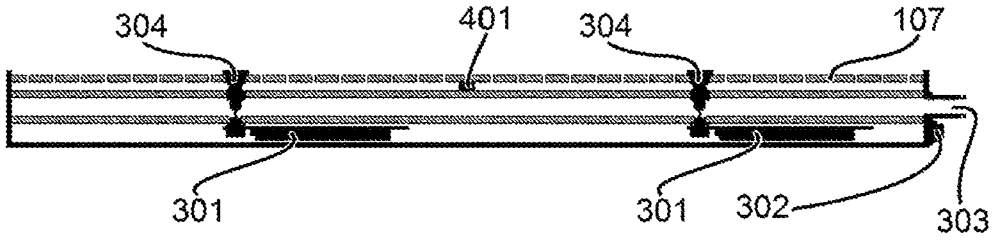

FIG. 4 shows, by way of example and schematically, the longitudinal section of a cascade of two linear arrangements of the device according to the invention—analogous to FIG. 3. The sectional plane runs as in FIG. 3. It can be seen here that the distribution channel has a gas-tight separation (401) which is intended to prevent undesired influence with respect to air flows and ion equilibrium within the individual portions. Furthermore, it can be seen that each of the two portions is supplied with air by the same feed channel; but each portion has its own HV supply (301) and its own ionization unit (304).

Figure 5:
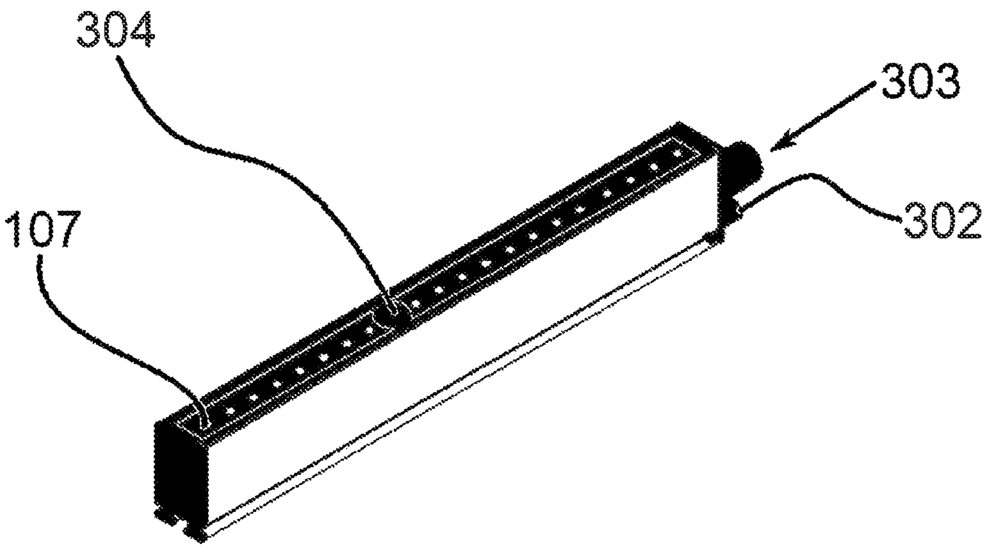

FIG. 5 schematically shows an exterior view of the linear arrangement of the device according to the invention presented in FIG. 3. The exterior view is shown in an isometric view, wherein the nozzle openings (107) are directed upwards. Furthermore, for better orientation, the inlet of the feed channel (303) and the connection for the voltage supply (302) are drawn on the side facing away from the observer.

Figure 6:
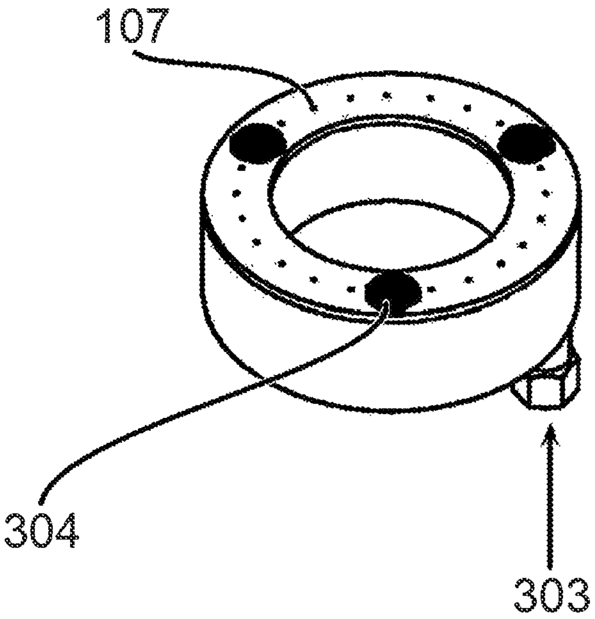

FIG. 6 schematically shows the exterior view of a round geometric embodiment. The internal design is analogous to that shown in FIGS. 3 and 4. The feed channel (101) and distribution channel (104) both have the same annular base surface. The two base surfaces are arranged congruently in their plan view so that the radially symmetric channels are arranged one above the other. The nozzle openings (107) in this case are arranged in a base surface plane of the distribution channel. The inlet of the feed channel (303) is directed downward.

Figure 7:
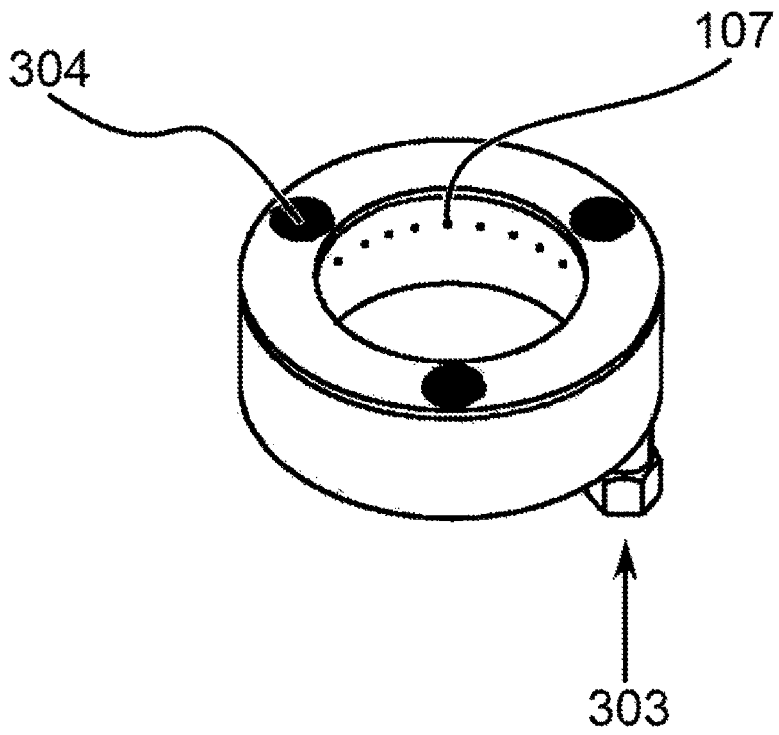

FIG. 7 schematically shows the outer representation of a round geometric embodiment. The internal design is analogous to that shown in FIGS. 3 and 4. The nozzle openings (107) in this case are arranged consistently on the concentric inner peripheral surface of the jacket of the distribution channel along a circumferential path curve. The inlet of the feed channel (303) is directed downward, analogously to FIG. 6.

In one embodiment, the feed channel (101) and the distribution channel (104) are arranged analogously to the device described in FIG. 3. The maximum length in this case is 300 mm. The width of the device is 20 mm, and the maximum height is 35 mm. The outer shell is made of plastic and is arranged analogously to the device shown in FIG. 5. The nozzle openings (107) are designed as 28 circular bores in the outer shell along its central longitudinal axis, and each have a diameter of 1 mm and a distance of 10 mm from one another. The inlet of the feed channel (303) is designed as a pluggable compressed air connection. In operation, compressed air is thus applied at an operating pressure between 0.2 bar or 200 hPa, and 6.0 bar or 0.6 MPa. The high voltage unit (301) arranged in the interior of the device is supplied with low voltage and controlled via the electrical plug connector (302). Thus, voltages of up to 3 KV are set at the ionization unit (302). The high voltage is generated by a piezoelectric transformer having a frequency of 70 KHz. With this voltage and the set operating pressure, a fanned flow of at least partially ionized air with a good ion balance between +35 V and −35 V is established via the nozzle openings (107).

REFERENCE SIGNS

101 Feed channel
102 Needle electrode
103 Flow
104 Distribution channel
105 Housing made of an electrically insulating material
106 Counter electrode
107 Nozzle opening
201 Bypass
202 Air inlet
203 Outlet
301 High-voltage supply
302 Connection for voltage supply and electrical control
303 Inlet of the feed channel
304 Ionization unit
401 Gas-tight separation

The invention claimed is:

1. A device for the ionization of gaseous media, comprising a feed channel having a gas feed, a distribution channel having at least one gas outlet, and at least one ionization unit, wherein the at least one ionization unit is designed as a connecting channel from the feed channel to the distribution channel and provided with an electrode, and with an associated counter electrode arranged about the electrode, and the electrode is configured to ionize gas flowing from the feed channel to the distribution channel through the ionization unit, characterized in that the gas flows around the electrode, and the at least one gas outlet is designed as one or more nozzles or a plurality of openings.

2. The device according to claim 1, characterized in that the openings or nozzles are arranged along a line on the surface, wherein the parameterization of this line has non-zero portions along the longitudinal direction of the distribution channel.

3. The device according to claim 1, characterized in that an insulating layer which is made of plastic, glass, ceramic or synthetic resin is arranged between the electrode of the ionization unit and the counter electrode.

4. The device according to claim 1, characterized in that the feed channel runs in a feed plane, the distribution channel runs in a distribution plane, and these two planes are substantially parallel to one another.

5. The device according to claim 1, characterized in that the distribution channel is at least partially surrounded by an earthed conductor and runs parallel to the distribution channel.

6. The device according to claim 1, characterized in that at least the distribution channel is designed for cascading at least two devices for the ionization of gaseous media.

7. A method for partial ionization of a gaseous medium, comprising using a device according to claim 1, comprising the steps of:

applying a high voltage between the electrode and the associated counter electrode, feeding a gaseous medium into the feed channel at an operating pressure which is above the ambient pressure, introducing the gaseous medium into the ionization unit through the gas inlet, passing the gaseous medium past the electrode and discharging the gaseous medium from the ionization unit through the gas outlet into the distribution channel, and blowing out the gaseous medium from the distribution channel through at least one opening or nozzle.

8. The method according to claim 7, characterized in that the high voltage is an alternating high voltage.

9. The method according to claim 7, characterized in that the peak values of the high voltage are in the range from 1 kV up to 50 kV, preferably in the range from 1.5 kV to 40 kV, and particularly preferably in the range from 2 kV to 35 kV.

10. The method according to claim 7, characterized in that the operating pressure is between 50 hPa and 2 MPa.

11. The method according to claim 7, characterized in that the gaseous medium is selected from among: air, purified air, nitrogen, argon, carbon dioxide, and oxygen, or a mixture thereof.

12. The device according to claim 1, characterized in that the counter electrode surrounds the associated electrode.

13. The device according to claim 1, characterized in that the counter electrode is cylindrically arranged about the associated electrode.

14. The device according to claim 1, characterized in that the device applies an alternating high voltage between the electrode and a counter electrode.

* * * * *